US012681935B2

(12) United States Patent
Widmoser et al.

(10) Patent No.: US 12,681,935 B2
(45) Date of Patent: Jul. 14, 2026

(54) METHOD FOR LARGE-SCALE SET SIMILARITY JOINS

(71) Applicant: Celonis SE, Munich (DE)

(72) Inventors: Manuel Widmoser, Salzburg (AT);
Nikolaus Augsten, Salzburg (AT);
Daniel Kocher, Eugendorf (AT); Willi Mann, Grünwald (DE)

(73) Assignee: CELONIS SE, Munich (DE)

( * ) Notice: Subject to any disclaimer, the term of this patent is extended or adjusted under 35 U.S.C. 154(b) by 0 days.

(21) Appl. No.: 18/839,367

(22) PCT Filed: Feb. 16, 2023

(86) PCT No.: PCT/EP2023/053919
§ 371 (c)(1),
(2) Date: Aug. 16, 2024

(87) PCT Pub. No.: WO2023/161125
PCT Pub. Date: Aug. 31, 2023

(65) Prior Publication Data
US 2025/0156424 A1      May 15, 2025

(30) Foreign Application Priority Data
Feb. 24, 2022    (EP) ..................................... 22158508

(51) Int. Cl.
*G06F 16/2455* (2019.01)
*G06F 16/22* (2019.01)
(52) U.S. Cl.
CPC ...... *G06F 16/2456* (2019.01); *G06F 16/2237* (2019.01)

(58) Field of Classification Search
CPC .......................... G06F 16/2456; G06F 16/2237
See application file for complete search history.

(56) References Cited

U.S. PATENT DOCUMENTS

| | | | | |
|---|---|---|---|---|
| 10,552,443 | B1 * | 2/2020 | Wu ...................... | G06F 16/2228 |
| 2005/0114331 | A1 * | 5/2005 | Wang ..................... | G16B 25/10 |
| 2016/0004736 | A1 * | 1/2016 | Tsuchida ............. | G06F 16/2228 |
| | | | | 707/742 |
| 2019/0392058 | A1 * | 12/2019 | Konow Krause ... | G06F 16/2237 |
| 2020/0257716 | A1 * | 8/2020 | Bhave ................. | G06F 11/3006 |
| 2021/0081598 | A1 * | 3/2021 | Raiskin .................. | G06N 3/088 |
| 2023/0119161 | A1 * | 4/2023 | Yadaw ................... | G06F 40/30 |
| | | | | 707/706 |

* cited by examiner

*Primary Examiner* — Khanh B Pham
*Assistant Examiner* — Kweku William Halm
(74) *Attorney, Agent, or Firm* — Thomas | Horstemeyer, LLP

(57) ABSTRACT

Provided is a computer-implemented method to find similar sets to a selected query set within a collection of sets, wherein each set represents a process. Each set is transformed to a representation in a vector space. Moreover, each set comprises a prefix. The method comprises creating and storing a data structure representing an inverted metric index in a storage device. The similar sets to the selected query set are identified by a probing step followed by a candidate verifying step. In the probing step, the inverted metric index is filtered by means of a predefined subspace of the vector space. In the candidate verifying step, each set of the filtered inverted metric index is identified as a similar set if its distance value is smaller or equal to a predefined distance threshold value.

11 Claims, 4 Drawing Sheets

(a) $B_{l=6}$ of token 3          (b) $B_{l=6}$ of token 4

(a)  global pivot elements
     $(p_1, p_2)$ (b)  local pivot elements
     $\hat{p}_1, \hat{p}_2$ (a) CELONIS2

(b) DBLP-V12

METHOD FOR LARGE-SCALE SET SIMILARITY JOINS

CROSS-RERERENCE TO RELATED APPLICATIONS

This application is a national phase entry of International Patent Application No. PCT/EP2023/053919, filed Feb. 16, 2023, which claims the benefit of EP 22158508.6, filed Feb. 24, 2022, the entire disclosures of which are hereby incorporated herein by reference in their entirety.

FIELD OF THE INVENTION

The invention relates to a method to find similar sets to a selected query set within a collection of sets, and more generally to the problem of set similarity joins.

BACKGROUND OF THE INVENTION

Thirsting for more information, an ever-increasing amount of data is recorded at present. In order to access the relevant information in data sets, in particular in large data sets, search operations are essential. However, finding exact matches within a data set is not always sufficient, for instance, when considering spelling or typing errors that frequently occur in text data. Hence, a considerably more practical feature for matching records in a data set is the similarity operator. The similarity operator finds similar records based on a function that determines the distance between two records.

One approach for finding similar records in a data set is given by a set similarity join. The set similarity join reports all pairs of similar records within a collection of sets and/or between multiple collections of sets. A collection of sets comprises sets, wherein each set in the collection of sets comprises a number of tokens. A set can represent the behavior of users in social media networks, different types of documents (e.g., tweets or abstracts), photo metadata, or process activities related to the process mining domain. Applications accounting for finding similar pairs in collections of sets are for example plagiarism detection, data cleaning, document clustering, process mining, and data mining in social networks.

Finding similar pairs of sets in collections of sets is a challenging task for even moderately large data sets. Using brute force, the number of required distance calculations is quadratic in the collection size, i.e., the number of sets in the collection. Hence, a set similarity join rapidly becomes computationally infeasible.

The performance of state-of-the-art solutions for the set similarity join heavily depends on the characteristics of the input data. Up to date, efficient set similarity join algorithms are based on a filter-verification framework, in which candidates are retrieved from an inverted-list index over signatures. To prune unqualified result pairs, candidates must be verified. Unfortunately, the inverted lists of candidates in the index often grow large for large data sets, for instance, if the number of tokens is small compared to the size of the collection and/or the distribution of tokens is close to a uniform distribution. Scanning through long inverted lists is computationally expensive and strongly limits the performance of existing solutions.

OBJECT OF THE INVENTION

Therefore, it is an object of the present invention to provide a method for computing a set similarity join which overcomes the aforementioned problems at least partially.

Solution According to the Invention

According to the invention, this object is solved by a method according to the independent claim. Preferred embodiments and further developments of the invention are defined in the dependent claims.

Accordingly, a computer-implemented method to find (i.e. determine) at least one similar set to a selected query set within a collection of sets is provided. Note that the method can, of course, also report a null set in case there is no similar set to the selected query set found in the collection of sets.

Each set comprises a number of tokens. Each set represents a process and each token represents a process step. The process comprises a series of process steps executed in at least one source computer system.

Each set is transformed to a representation in a vector space, wherein the representation is stored with a storage device. Each set comprises a prefix, wherein the prefix comprises at least one token of the corresponding set up to a predefined number of tokens.

A data structure is created and stored with a storage device. The data structure comprises multiple unique elements, wherein each unique element represents a token comprised in the collection of sets. Each set of at least a subset of the collection of sets is linked to at least one unique element of the data structure representing the at least one token of its prefix. The linked sets are grouped by their number of tokens into at least one group for each unique element.

Similar sets to the selected query set are identified according to the following steps:

In a probing step, for each group of the data structure a spatial index is constructed from the linked sets. Each linked set is exclusively inserted into a collection of potentially similar sets if its representation in the vector space is located within a predefined subspace of the vector space. The collection of potentially similar sets for each group is stored in the storage device, such that the collection of potentially similar sets comprises a subset of the linked sets of each group.

Often, the subset of the linked sets of each group is smaller than the collection of linked sets of each group. Hence, the overall number of potentially similar sets can be reduced. However, depending on the collection of sets to be analyzed, the subset of the linked sets can also have the size of the collection of linked sets, namely if all linked sets are similar to the selected query set.

In a candidate verifying step, for each potentially similar set of the spatial index a distance value to the selected query set is computed using a predefined distance function. A potentially similar set is identified as one of the at least one similar set if the distance value is smaller or equal to a predefined threshold value.

The at least one similar set represents at least one similar process to a selected process within a collection of processes. In other words, similar sets represent similar processes, in particular process instances, within a collection of processes The method according to the invention has the advantage, that the inverted list for each unique token can already be effectively reduced in advance, i.e., before even evaluating the predefined distance function for each member of the inverted list. Note that the distance calculation is a computationally costly operation. Therefore, in the candidate verifying step, a much-reduced number of potentially similar sets have to be tested by computing the actual distance value to the selected query set using the predefined distance function.

The reduction of the number of potentially similar sets for each unique element of the data structure is achieved by exploiting the metric properties of the linked sets. In general, the transformations of the sets of the collection of sets into a representation in a vector space and a range query therein is computationally less expensive than the calculation of the distance value between each set of the collection of sets and a selected query set using the predefined distance function. In combination with an adequately predefined subspace of the vector space for filtering the representations of the potentially similar sets the number of required distance calculations in the candidate verifying step can be reduced and thus the overall runtime of the set similarity join can be reduced.

The inventors found, that the reduction of potentially similar sets using a metric range query filter works particularly well in the case of collection of sets representing collection of processes. In practice, collection of processes are usually very large data sets, wherein the token universe, i.e., the overall number of unique tokens in the collection of sets is small compared to the number of sets in the collection of sets. In the domain of process mining, a token represents a process step and a set represents a process instance, which is an execution of a process in a source computer system or with aid of a source computer system.

Preferably, the predefined subspace is a query rectangle, wherein the size of the query rectangle relates to the predefined threshold value.

Preferably, the predefined number of tokens in the prefix is computed based on the predefined distance function and the predefined threshold value.

Depending on the choice of the predefined distance function, further parameters may be involved in the calculation of the number of tokens in the prefix. For instance, if the distance function is not the Hamming distance function, then the number of tokens in the prefix further depends on the number of tokens per set, i.e., the prefix length can change for every different set size.

Preferably, the method according to the invention is repeated, wherein in each repetition a different set of the collection of sets is the selected query set, until all sets of the collection of sets are processed.

The repetition of the method for each set of the collection of sets guarantees to find all pairs of similar sets in the collection of sets.

In one embodiment, the data structure and the collection of potentially similar sets are stored in a volatile memory of the storage device, in particular the main memory.

Preferably, a predefined number of pivot elements is chosen from the collection of sets, wherein the predefined number of pivot elements span the vector space.

In this embodiment, the vector space is identical for each group of the data structure, i.e., the vector space is global.

In one preferred embodiment, for each group of the data structure the predefined number of pivot elements is chosen from the linked sets of the corresponding group.

In the preferred embodiment, the vector space is generated separately for each group of the data structure, based on the linked sets of the corresponding group. It has been found, that the local vector spaces can enable a sparser distribution of the representations of the linked sets in these local vector spaces, such that the metric query range filter using the (same) predefined subspace of the local vector space works even more effectively.

Preferably, the spatial index is only constructed for groups comprising at least a predefined number of linked sets. For each group comprising less than the predefined number of linked sets the linked sets are sorted according to a random dimension of their representations.

While the creation and population of a spatial index can be inefficient for filtering only a small amount of linked sets, sorting the linked sets according to a random dimension enables filtering of a small amount of linked sets in an efficient way, e.g., by use of a one-dimensional range query.

In one embodiment, an upper bound and a lower bound is computed for the selected query set. Each set comprising more tokens than the upper bound of the selected query set or less tokens than the lower bound of the selected query set is skipped.

Preferably, in the probing step the groups are processed according to an increasing number of tokens of their respective linked sets. Each set comprising more tokens than the number of tokens of the selected query set is skipped.

The advantage of processing sets in increasing order is that once a set falls through the lower bound criterion, it can be removed from the data structure permanently. This avoids examining ineligible sets and additionally frees memory.

Preferably, in the probing step, each set having a token in its prefix matching a token in the prefix of the selected query set is skipped if the matching token is located at a position in the set from which less tokens remain than required for a similarity between the set and the selected query set according to the predefined threshold value.

In one embodiment, each group of the data structure comprises at least one linked set.

In other words, a group is only added to the data structure, if at least one linked set is found for the group. Technically the groups can be represented by buckets which are linked to each unique element of the data structure. Thus, avoiding the creation of unpopulated buckets in the data structure has the advantage to occupy less memory.

Preferably, the predefined distance function is any of the group comprising:

- a bound distance function, in particular the Jaccard distance function, wherein the distance value is scaled to an unbounded distance value,
- an unbound distance function, in particular the Hamming distance function, and
- a non-metric distance function, in particular the Dice distance function or the Cosine distance function, wherein the predefined threshold value is scaled by a parameter, wherein the parameter is calculated based on the number of tokens in each set.

In one embodiment, the collection of sets comprises a large fraction of sets comprising a similar number of tokens.

In other words, the method according to the invention works well if many sets in the collection of sets comprise a similar size, which leads to fewer groups in the data structure and thus to fewer range queries on the spatial index.

In one embodiment, the number of unique elements in a data structure is small compared to the cardinality of the collection of sets.

In other words, the token universe is small compared to the number of sets in the collection of sets, which is usually the case for process mining data sets. It has been found that the method according to the invention works particularly well for data sets with this characteristic since these data sets are predestined for producing long inverted lists in state-of-the-art methods for the set similarity join. Hence, other algorithms spend their time in scanning those long inverted lists, whereas the solution according to an aspect of the invention only considers a subset of each inverted list, wherein the subset is often small with respect to the original inverted list (and can be even a null set in the best case).

BRIEF DESCRIPTION OF THE FIGURES

Details and features of the invention as well as concrete embodiments of the invention can be derived from the following description in connection with the drawing, in which.

DETAILED DESCRIPTION OF THE INVENTION

Figure 1:
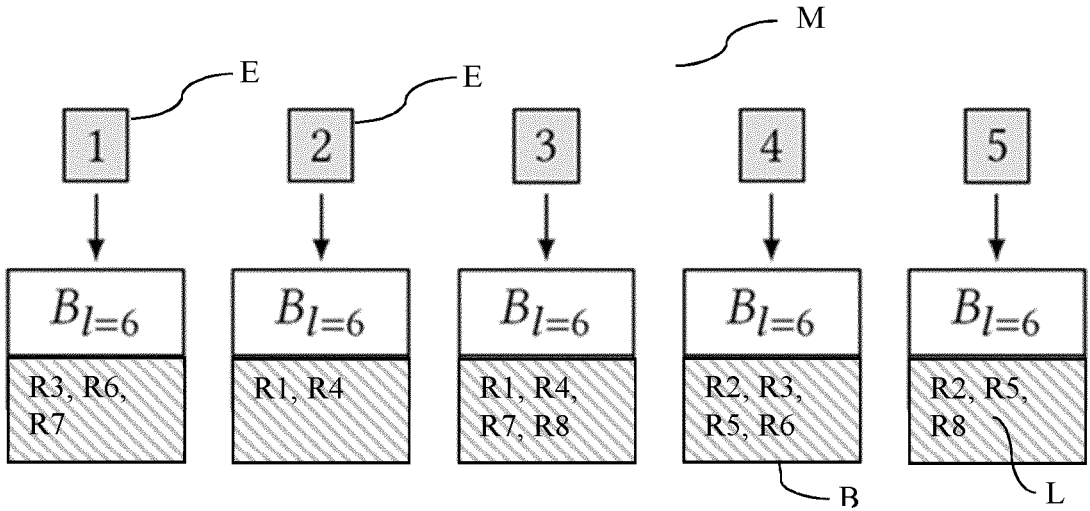
FIG. 1 an inverted metric index according to an embodiment of the invention based on the example from Table 2.

A set similarity join finds all pairs of similar sets P within a collection of sets based on a distance function D and a threshold value T. In particular, two sets R of a collection of sets are considered similar, if their distance value, which is computed by using the distance function D, is smaller or equal to a predefined threshold value T.

In order to determine similarity between two sets R of a collection, a well-defined measure between all sets R in the collection must exist. The measure is given by the predefined distance function D. The distance functions D commonly used in the domain of process mining are in particular the Jaccard, Cosine, Dice and the Hamming distance functions. Likewise, corresponding similarity functions can be used.

A naïve nested loop join to find all pairs of similar sets P in a collection of sets scales quadratic in the number of distance computations. Clearly, a quadratic runtime complexity becomes infeasible as soon as the number of sets is sufficiently large. Therefore, a filtering framework which reduces complexity is of great importance. Previously known are in particular the prefix filtering and the length filtering as two filtering techniques for set similarity joins.

The prefix filter is a technique to prune unqualified sets in advance, i.e., before computing their distance value to a selected query set Q. The prefix filter is based on the observation that subsets of a set and the selected query set Q must share at least one token to qualify as candidate or as potentially similar set C. The predefined subset is called prefix and is formed by the first few tokens of a set R; Q under the assumption that all sets R are in a total order. Hence, the prefix filter allows to find potentially similar sets P by investigating only a few tokens rather than entire sets.

The prefix filter can be combined with the length filter. For every distance function D, a lower bound on join partners R for a selected query set Q and an upper bound on join partners R for the selected query set Q is defined. The length filter then defines a criterion according to which potentially similar sets C are pruned, namely if their number of elements is not between the lower bound and the upper bound of the selected query set Q. Hence, the length filter further reduces the number of potentially similar sets C in advance.

A state-of-the-art algorithm for exact similarity joins which is based on prefix filtering is the AllPairs algorithm in combination with length filtering.

Essentially, the AllPairs algorithm is based on the generation of a prefix index. The prefix index is an array that contains for each token in the universe of the collection of sets a pointer to an inverted list of sets that share the corresponding token in the prefix. The sets in the inverted lists are sorted by increasing set sizes. For large data sets with a small token universe, the inverted lists therefore can become very long. Once the index is constructed, a selected query set can be probed against the index. In doing so, for every token of the prefix of the selected query set, the sets of the inverted lists pointed to from the corresponding tokens in the prefix index are selected as pre-candidates. Further, the length filter may be applied and duplicated sets from the pre-candidate collection removed. For the resulting candidates, the similar sets to the selected query set can be identified by evaluating the distance value between each candidate set and the selected query set. However, in large data sets the linked lists grow large, such that the effective number of candidates is still large, which leads to many, often unnecessary verifications of candidates.

It were the inventors who first found that the limitations of previous filtering techniques in the case of large data sets can be overcome by extending the list of filters with filtering methods that exploit metric properties of the sets R in combination with the predefined distance function D. Whereas the prefix filter and the length filter are custom-tailored to sets, a metric-based filter leverages from the fact that sets R in combination with a distance function D form a metric space.

Hence, sets R can be transformed into a vector space V and bound by the maximum distance using a set of selected pivot elements O from the collection of sets. The vector space V can be n-dimensional, wherein n is the number of selected pivot elements O. With the sets R of the collection of sets being mapped into the n-dimensional vector space V, a range query can be used to find potentially similar sets C. More specifically, for a selected query set Q, the metric range query aims for finding candidate sets C that are located in a predefined subspace A of the n-dimensional vector space V, wherein the subspace O is also denoted as e-range of the representation $\Phi$ of the selected query set Q in the vector space.

The metric range query is based on the triangle inequality. Hence, the predefined distance function D is required to be a metric. However, the method according to the invention also works for non-metric distance functions, such as the Dice distance and the Cosine distance, by projecting the candidate generation for Dice or Cosine to a metric distance, for instance, the Jaccard distance.

In its simplest form, the projection can be the following: The join is computed using the Jaccard distance with an adjusted threshold value T such that a superset of candidates C is received. This superset of candidates C includes all similar sets P as would be received with computing the join with the Dice distance or the Cosine distance, respectively. Eventually, in the verifying step, unwanted candidates C are eliminated.

In the following an embodiment of the method according to the invention is presented by way of a concrete example drawn from the domain of process mining.

The data set used in this example assumes the following process steps in the execution of processes of a specific customer: "Order", "Payment", "Delivery", "Return" and so on. A process instance, that is an execution of a customer process, can be represented by forming 2-grams, for instance, {("Order", "Payment"), ("Payment", "Delivery"), ("Delivery", "Return")}. The 2-grams can be mapped to sets comprising a number of tokens, wherein duplicate tokens are moved, such that the process instances can be represented by integer-based sets, e.g., {1, 2, 3}.

For the sake of this example, an even simpler data model is assumed. Each process step is assigned to a unique token. Table 1 summarizes the assignment of process steps to tokens. For instance, the process step "Order" is assigned to token "1", the process step "Withdrawal" is assigned to token "2", etc. Consequently, the example process {"Order", "Payment", "Delivery", "Return"} can be represented by the set {1, 7, 9, 8}.

TABLE 1

Exemplary assignment of process steps to tokens.

| Process step | Token |
| --- | --- |
| Order | 1 |
| Withdrawal | 2 |
| Refund | 3 |
| Collect | 4 |
| Assignment | 5 |
| Requisition | 6 |
| Payment | 7 |
| Return | 8 |
| Delivery | 9 |
| Purchase | 10 |
| Package | 11 |

Table 2 shows a collection of records or sets which form a subset of a process mining data set and will be used to demonstrate an embodiment of the method according to the invention. In particular, it is shown below, how the similar sets P to the selected query record Q are found from the collection of sets of Table 2.

TABLE 2

A collection of sets, wherein set Q is the selected query set. The representation of each set in a two-dimensional vector space is computed based on the two pivot elements R1 and R8 from the collection of sets.

| Set ID | Set | Representation of set R in the vector space V |
| --- | --- | --- |
| R1 | {2, 3, 4, 7, 9, 10} | ⟨0, 4⟩ |
| R2 | {4, 5, 6, 7, 8, 10} | ⟨6, 4⟩ |
| R3 | {1, 4, 6, 7, 8, 9} | ⟨6, 6⟩ |
| R4 | {2, 3, 7, 8, 9, 10} | ⟨2, 4⟩ |
| R5 | {4, 5, 7, 9, 10, 11} | ⟨4, 4⟩ |
| R6 | {1, 4, 5, 6, 7, 9} | ⟨6, 4⟩ |
| R7 | {1, 3, 5, 6, 7, 9} | ⟨6, 2⟩ |
| R8 | {3, 5, 6, 7, 9, 10} | ⟨4, 0⟩ |
| Q | {3, 4, 5, 7, 9, 10, 11} | ⟨3, 3⟩ |

The predefined distance function D determines the similarity between two records R, i.e., two sets R of the collection of sets. Intuitively, the larger the distance value computed by the distance function D, the more dissimilar are the two records R to each other.

The method according to the invention generally requires, that the distance function D is a metric, i.e., additional properties, such as the triangle inequality, must be satisfied. However, this requirement can be overcome by using an appropriate approximation, such that also non-metric distance functions D can be used.

In the present example, the Hamming distance is used. To compute the Hamming distance, for instance, between the records R1 and R4 from Table 2, we get a distance value of 2.

In the present example, it is assumed for simplicity, that all sets R are of equal size, namely size 6, whereas the selected query record Q is of size 7. From the collection of sets the set of pivot elements O is selected as {R1, R8}. The exact prefix size, i.e., the number of elements in the prefix, can be derived from the distance function D in combination with the predefined threshold value T. In this example, the prefix size is 2.

FIG. 1 shows an inverted metric index according to an embodiment of the invention based on the example from Table 2.

The inverted metric index M shown in FIG. 1 is constructed using an embodiment of the method according to the invention.

Each set R of the collection of sets is transformed to a representation Φ in a vector space V. The transformation can be performed in advance in a preprocessing step or on-the-fly when processing through the collection of sets. The representations Φ of the sets R; Q are stored with a storage device, in particular, in the main memory.

The vector space V is spanned by a predefined number of pivot elements O wherein the predefined number of pivot elements O is chosen from the collection of sets. Preferably, the pivot elements O are picked at random which is very fast. However, also any existing method can be used to find pivot elements O which are optimized with respect to their pruning capabilities. In this example, the global pivot elements O are chosen as R1 and R8.

The inverted metric index M abstracts prefix, length and metric range filtering into a single data structure. The index structure M can be represented as a fixed-size array. The data structure M comprises multiple unique elements E, wherein each unique element E represents a token comprised in the collection of sets.

During processing, each set R; L is linked to at least one unique element E of the data structure M representing the at least one token of its prefix. The linked sets L are grouped by their number of tokens, i.e., their set length, into at least one group B for each unique element. In one embodiment, the groups can be stored in an inverted list of buckets linked to the corresponding unique element E. A bucket B stores all sets L of a specific length that share the corresponding token in their prefix. The set length, or set size, is given by the number of tokens in the set R. Each bucket B can therefore be identified by a combination of token and set length. In an inverted list linked to a unique element E, the buckets B are preferably sorted by the set length in increasing order.

In this example, for each record R, the first two tokens form the prefix. For every token in the prefix, the corresponding bucket list of the inverted metric index M is accessed and the record R is inserted into the bucket B representing set length 6. Since all records R1 to R8 of Table 2 are of equal size, every token of the inverted metric index M shown in FIG. 1 points to a single bucket B representing length 6. The relation between a unique element E representing a token and the buckets B is represented by the arrows in FIG. 1. With the records R of Table 2 being distributed among the buckets B of the inverted metric index M, all records L within a bucket B, i.e., all linked sets L of a group, are bulk-loaded into its corresponding spatial index.

In many cases, only very few sets R fall into a bucket B representing a specific combination of token and set length. Since a spatial index can carry additional computational overhead, such as in the case of a tree-structure, it can be beneficial to avoid computing such complex structures for only very few sets. For instance, for an R-tree, a minimum number of nodes have to be pre-allocated, although the number of records in a bucket B is low. A bucket B to which a low number of linked sets L as assigned is subsequently also defined as low-load bucket.

If many buckets B in the inverted metric index M turn out to be low-loaded, the cost of constructing the metric index M raises and may eventually exceed its benefits. Therefore, preferably a spatial index for a bucket B is only created and populated if there are at least a predefined number of records to insert, wherein the predefined number of records to insert is a hyper-parameter, which is further called the cutoff parameter. Otherwise, a low-load bucket B is created.

In the present example, however, the cutoff parameter is chosen to carry a value of zero, i.e., for every bucket B the spatial index is created and populated.

Similar sets P to their selected query set Q are identified according to the following steps: a probing step S1 and a candidate verifying step S2.

In the probing step S1, the selected query record Q is probed against the inverted metric index M. For every token of the prefix of the selected query record Q, in this case the tokens "3" and "4", the inverted metric index M is accessed at the position of the corresponding unique element E and the linked list of buckets is retrieved. In this example, the lists for both tokens "3" and "4" only contain a single entry, namely the bucket B of length 6. In case of various set lengths, the length filter can be applied. Using the length filter, it is only necessary to consider those buckets of the linked list which represent set lengths that are within the lower and upper size bounds of the selected query record Q, respectively.

The linked sets L of the retrieved buckets B are filtered by range querying the corresponding spatial index. In this example, the vector space V is two-dimensional, and the range query is executed by placing a query rectangle A around the representation Φ of the selected query record Q. The size of the query rectangle A relates to the predefined threshold value T, wherein in this case T equals 2. Hence, the query rectangle A is given by the representation ([1,5], [1,5]) on the two-dimensional grid. All representations Φ of the linked sets L of the corresponding bucket B that are not contained in this query rectangle A can be pruned.

Figure 2:
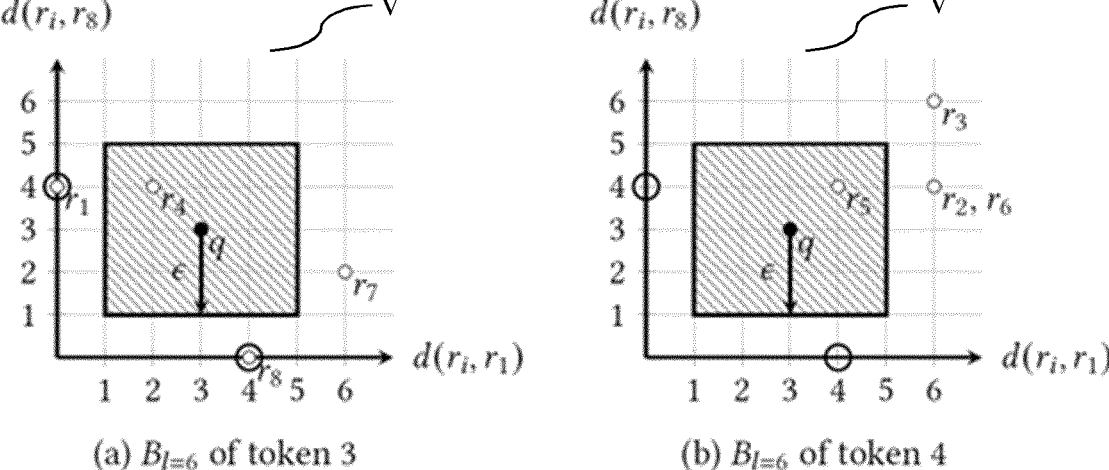
FIG. 2 the range query according to an embodiment of the invention in the probing step.

FIG. 2 visualizes the range query according to an embodiment of the invention in the probing step S1.

In FIG. 2, the records R; Q are labelled with small letters for the sake of readability.

As shown in panel (a) of FIG. 2, in this example only record R4 is returned as a candidate of the bucket linked to the unique token "3". The records R1, R7 and R8, instead, can be pruned and do not have to be evaluated using the predefined distance function D.

For the bucket list at position "4" in the inverted metric index M, which corresponds to the second token in the prefix of the selected query record Q, the same query rectangle A is used and placed onto the grid of the spatial index of the bucket B which was retrieved from the index M. As shown in panel (b) of FIG. 2, only a single record is located in the rectangle A, record R5, which is added to the set of potentially similar sets C. The records R2, R3 and R6 of the bucket B linked to the unique token "4" in the inverted metric index M, instead, are pruned.

Since the prefix size is 2 in this example, the probing step is finished and finally, the generated candidates are to be verified, e.g., by computing the actual distance values to the selected query record Q.

In the candidate verifying step S2, for each potentially similar set C of the spatial index a distance value to the selected query set Q is computed using the predefined distance function D. A potentially similar set C is identified as a similar set P if the distance value is smaller or equal to the predefined threshold value T. In this example, the Hamming distance between the selected query record Q and the record R4 equals 5 and thus is larger than the predefined threshold value, which is 2. The Hamming distance between the selected query record Q and the record R5, the second candidate set, equals 1, which satisfies the criterion for R5 to be considered a similar set P to the selected query set Q. Thus, the pair (Q, R5) is reported as a result pair.

This simple example already demonstrates the technical advantage of the method according to the invention over the AllPairs algorithm. In contrast to AllPairs, which reports eight candidates for this particular example, namely all linked sets in the lists of the tokens "3" and "4" in the corresponding prefix index, the method according to the invention only reports two candidates, R4 and R5. Instead of computing eight distance values for the eight candidates found with the AllPairs algorithm, the method according to the invention only computes two distance values using the predefined distance function D. This reduction of candidate sets is achieved by transforming the generic metric space of the sets R in combination with the predefined distance function D into a two-dimensional vector space V by using two pivot elements O from the collection of sets.

Naturally, the pivot-based approach generates a certain computational overhead, as intermediate distances based on the pivot elements O have to be precomputed. Once the intermediate distances are precomputed, they can be exploited to determine whether two sets R; Q are similar before computing the expensive distance value among them. In doing so, the number of candidate sets C can be effectively reduced, which gains an overall advantage over the AllPairs algorithm, in particular if the token universe is small compared to the number of sets in the collection of sets.

To some extent, the pivot-based approach keeps improving as more pivot elements O are employed, however, more pivot elements O also increase the amount of memory space required. It was found by the inventors, that an appropriated index structure, such as the inverted metric index M, is essential to efficiently obtain a reduction in the set of candidates C by leveraging the precomputed distances using the pivot elements O.

In the present example, only a single selected query record Q was probed against the inverted metric index M. To obtain the result of the set similarity join, every set R; Q needs to be probed against the index M and the resulting candidates C need to be verified, respectively.

Figure 3:
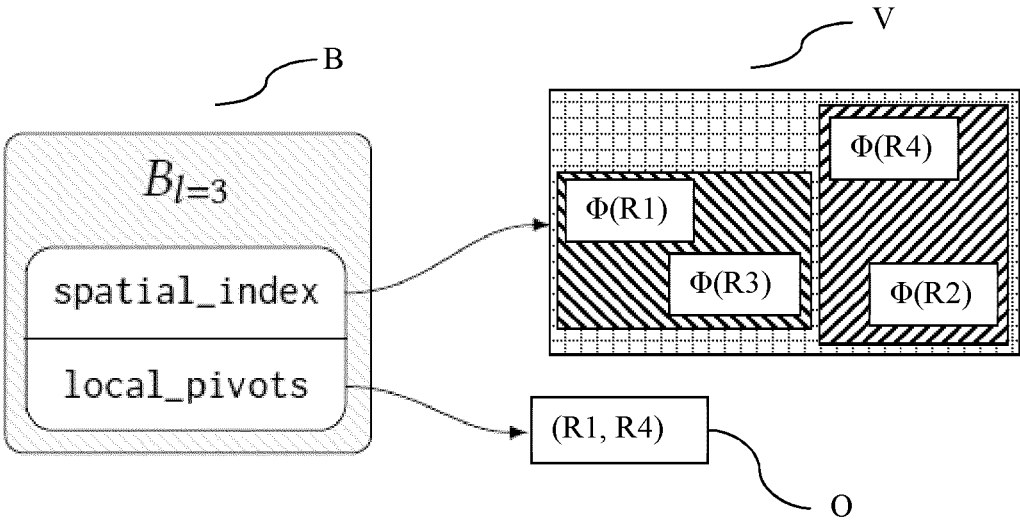
FIG. 3 an exemplary regular bucket representing length 3 for a given token as part of an inverted metric index according to an embodiment of the invention.

FIG. 3 sketches an exemplary regular bucket representing length 3 for a given token as part of an inverted metric index according to an embodiment of the invention.

A regular bucket B, such as shown in FIG. 3, contains a "spatial_index" attribute, in which the linked sets L assigned to the bucket B are stored in a way such that a n-dimensional range query can be performed. In this particular example of FIG. 3, the linked sets L are stored in a two-dimensional R-tree. In one embodiment, when the spatial index in a bucket B representing a specific combination of token and set length is queried, only potentially similar sets C that (1) share the corresponding token with the selected query record Q in the prefix, (2) pass the length filter, and (3) are located within the query rectangle of the vector space are returned. Ideally, a bucket B representing a specific combination of token and set length is only created in the inverted metric index M, if there exists at least one set R for the specific token of the specific size.

In one preferred embodiment, the selected query record Q is probed against the inverted metric index M in increasing set size order, such that buckets B can be removed from the inverted metric index M if the length a bucket B represents is no longer required.

In the example presented above, global pivot elements O were chosen once at the beginning from the collection of sets. Preferably, the pivot elements O are not selected globally once at the beginning and used to transform the entire data set based on the assumption that all the records R; Q of the collection of sets reside in a single vector space V. Instead, the inverted metric index M reveals that the linked sets L grouped into individual buckets B form their own local vector spaces V. Hence, the pivot elements O are preferably chosen locally, i.e., picked from the linked records L which are assigned to a bucket B, for each bucket B separately. As shown in the example of FIG. 3, the local pivot elements O, (R1, R4), can be stored in the "local_pivot" attribute of the bucket B. In doing so, all sets L in each bucket are mapped to their vector space V representations using the corresponding local pivot elements O.

Nevertheless, this procedure requires a bucket B to contain at minimum n number of records, where n represents the dimensionality. In case a bucket B contains less than n records, the global pivot elements O can be used as a fallback solution to transform the sets L within the corresponding bucket B.

Figure 4:
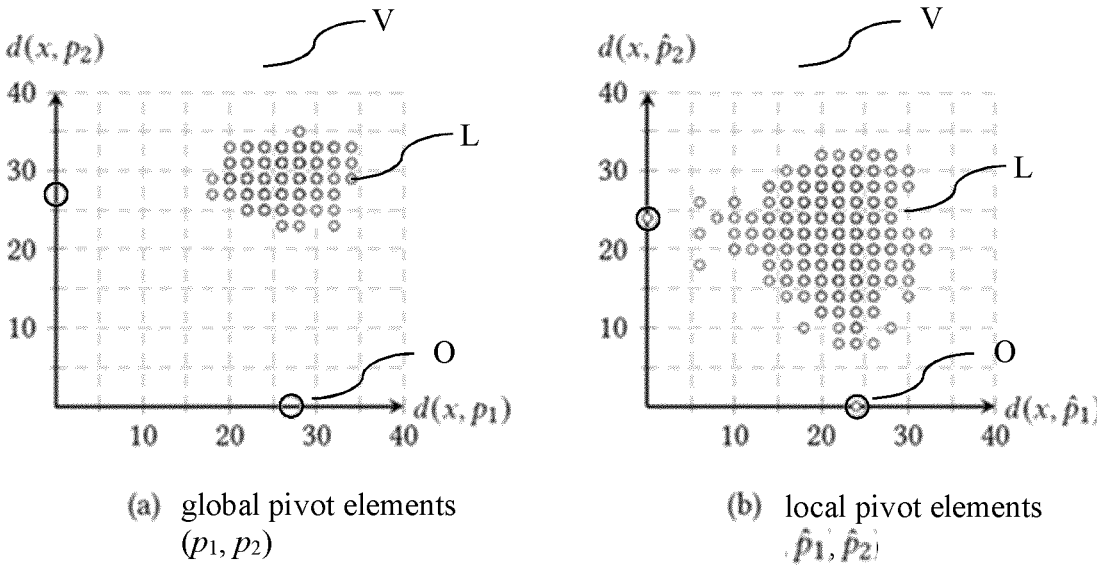
FIG. 4 the representations of a bucket which is globally mapped (a) and locally mapped (b) according to an embodiment of the invention.

FIG. 4 visualizes the representations of a bucket which is globally mapped (a) and locally mapped (b) according to an embodiment of the invention.

The bucket represented in FIG. 4 represents a set length of 20 and is chosen from a process mining data set.

Panel (a) of FIG. 4 visualizes the representations Φ of the linked sets L assigned to a bucket B transformed into a two-dimensional vector space V using global pivot elements O, which are represented by the large circles on the two axes. The distance function D in this example is the Jaccard distance, and the two pivot elements O are selected randomly from the collection of sets. Note that the global pivot elements O do not occur in the selected bucket.

In panel (b) of FIG. 4 the representations Φ of the linked sets L of the same bucket B are shown, however, the representations Φ were computed using local pivot elements O. The local pivot elements O were chosen randomly from the sets L assigned to the bucket B, and are marked by a double circle.

The local pivot elements O distribute the representations Φ in the two-dimensional vector space V of the bucket B better, and therefore substantially increase the pruning power. This example is just picked for demonstration, however, the inventors found that the effect of increasing pruning power by choosing local pivot elements over global pivot elements is not limited to this specific data set as it translates to experiments on further data sets.

Since local pivot elements O need to be chosen individually for each bucket B, it is preferred to choose the local pivot elements O at random which is very fast, instead of computing the best pivot elements O for each bucket B separately. Further, probing a selected query set Q against a bucket B, requires to remap the selected query record Q using the local pivot elements O. The remapping of the probing record Q is more expensive for larger set sizes.

Figure 5:
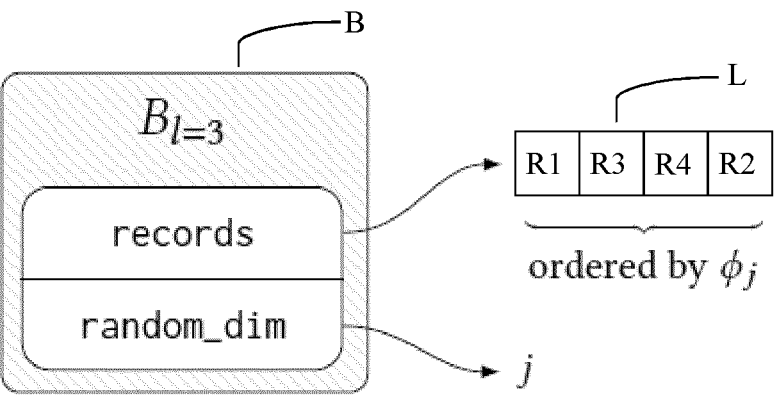
FIG. 5 an exemplary low-load bucket representing length 3 for a given token as part of an inverted metric index according to an embodiment of the invention.

FIG. 5 sketches an exemplary low-load bucket representing length 3 for a given token as part of an inverted metric index according to an embodiment of the invention.

As mentioned above, low-load buckets B appear, if less linked sets L are assigned to a bucket B then a predefined cutoff parameter. Hence, for low-load buckets, the creation and population of a spatial index is ineffective. Instead, a dimension j is drawn uniformly at random from [1, n] and the records stored in the "records" attribute are sorted by the j-th dimension in their vector space representation. Based on this sorting, a one-dimensional range query can be performed, which only requires the ordering by j.

To probe a selected query set Q against a low-load bucket B, first the value of its representation is extracted at dimension j, which simply is the distance between the selected query set Q and the j-th pivot element O. Then, it is searched for the first record of the bucket for which the distance is larger than or equal to a one-dimensional query rectangle A centered around the extracted value, i.e., the extracted value minus the predefined threshold value T, and scanned until the extracted value plus the predefined threshold value T plus one is reached. For instance, a binary search can be utilized. It has been found, that in most cases, a one-dimensional range query reports fewer candidates for low-load buckets than scanning the whole list of sets L as it is done by AllPairs.

Figure 6:
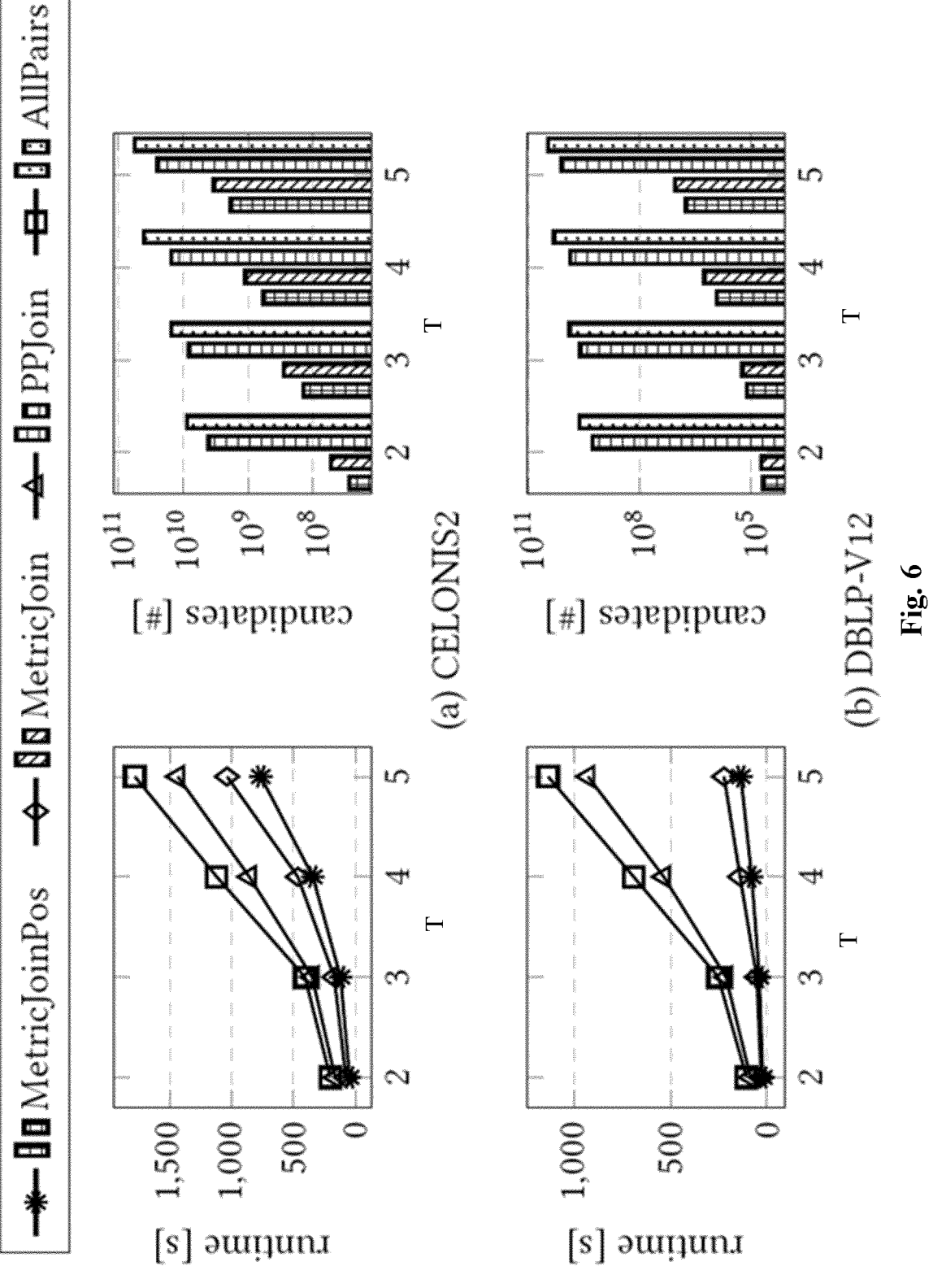
FIG. 6 the performance of the method according to two embodiments of the invention compared to two methods of prior art, each evaluated on two different data sets.

FIG. 6 contrasts the performance of the method according to two embodiments of the invention from two methods of prior art, each method evaluated on two different data sets.

In the experimental evaluation of the method according to the invention, the inventors observed that the number of candidates reported by the set similarity join algorithms correlates with the runtime behavior. In other words, the more candidates C a set similarity join algorithm reports, the larger the runtime the set similarity join algorithm requires for many datasets. Since the method according to the invention always reports fewer candidates C than state-of-the-art prefix-spaced solutions, the latter can be outperformed in many cases.

In FIG. 6a the results of various methods are shown on a process mining data set, labeled CELONIS2. In the left-hand panel of FIG. 6a, the runtime of the methods is shown for different selections of the predefined threshold value T. More specifically, the diamond-shaped symbols represent the runtime of the MetricJoin algorithm, which represents an embodiment of the invention. The square-shaped symbols represents the runtime of the state-of-the-art AllPairs algorithm. For every selected predefined threshold value T, the MetricJoin algorithm outperforms the AllPairs algorithm for the process mining data set CELONIS2. The technical advantage of the MetricJoin algorithm compared to the AllPairs algorithm results from the ability to reduce the number of candidates, as visualized in the right-hand panel of FIG. 6a.

A qualitatively similar result is achieved for the second data set, a bibliographic collection of academic papers in the field of computer sciences from the digital bibliographic and library project (DBLP), labeled DBLP-V12, as shown in FIG. 6b. The runtime of the MetricJoin algorithm clearly outperforms the runtime of the AllPairs algorithm for every predefined threshold value T, in particular with increasing threshold values T.

Most remarkably, the experiments carried out by the inventors showed that even additional filters applied on state-of-the-art algorithms such as AllPairs cannot simply compensate the drawbacks of prior art. For instance, the positional filter was applied on top of the AllPairs algorithm, subsequently referred to as PPJoin, of which the runtimes are represented by the triangle-shaped symbols in FIG. 6.

The positional filter enhances the prefix filter in that it utilizes positional information of tokens to further reduce the number of candidates. The key idea is to find an overlapping token in their prefixes of the probing set Q and a set R of the index and to validate whether the remaining number of tokens can still reach the minimum required amount of overlap to consider the two sets similar. In case the remaining number of tokens cannot reach the minimum required amount of overlap, the corresponding set of the index can be safely pruned.

As the positional filter further reduces the number of candidates C, also the overall runtime is decreased for all predefined threshold values T for PPJoin over AllPairs, as shown in FIG. 6. However, the PPJoin algorithm cannot close the gap to the MetricJoin algorithm in terms of performance as the reduction of candidates is not as efficient as it turns out when exploiting the metric properties of the sets R; Q in combination with the predefined distance function D.

Moreover, the combination of the positional filter with the MetricJoin algorithm, referred to as MetricJoinPos and represented by the star-shaped symbols in FIG. 6, even further reduces the number of candidates reported. Therefore, an additional filter applied on the MetricJoin can reduce the runtime of the set similarity join even further. As a result, the performance gap between MetricJoin and AllPairs is very similar to the performance gap of MetricJoinPos and PPJoin.

LIST OF REFERENCE SIGNS

A subspace of the vector space V, in particular a query rectangle
B group of linked sets L, in particular represented as bucket
C potentially similar set or candidate set
D predefined distance function
E unique elements of the data structure M
L set linked to a unique element E of the data structure M
M data structure, in particular the inverted metric index
O pivot elements chosen from the collection of sets
P set which is similar to the selected query set
Q selected query set
R set of the collection of sets
S1 probing step
S2 candidate verifying step
T threshold value
V n-dimensional vector space

What is claimed:

1. A computer-implemented method of finding at least one similar set to a selected query set within a collection of sets, wherein each set comprises a number of tokens, wherein each set represents a process and each token represents a process step, wherein the process comprises a series of process steps executed in at least one source computer system, wherein each set is transformed, by at least one computer processor, to a representation in a vector space, wherein the representation is stored, by at least one computer processor, within a storage device, wherein each set comprises a prefix, wherein the prefix comprises at least one token of the corresponding set up to a predefined number of tokens, wherein a data structure is created and stored, by at least one computer processor, within the storage device, wherein the data structure comprises multiple unique elements, wherein each unique element represents a token comprised in the collection of sets, wherein each set of at least a subset of the collection of sets is linked to at least one unique element of the data structure representing the at least one token of its prefix, wherein the linked sets are grouped by their number of tokens into at least one group for the corresponding unique element, wherein similar sets to the selected query set are identified, by at least one computer processor, according to the following steps:

in a probing step, for each group of the data structure a spatial index is constructed, by at least one processor, from the linked sets, wherein each linked set is exclusively inserted into a collection of potentially similar sets if its representation in the vector space is located within a predefined subspace of the vector space, wherein the collection of potentially similar sets for each group is stored, by at least one computer processor, in the storage device, such that the collection of potentially similar sets comprises a subset of the linked sets of each group, in a candidate verifying step, for each potentially similar set of the spatial index a distance value to the selected query set is computed, by at least one computer processor, using a predefined distance function, wherein a potentially similar set is identified, by at least one computer processor, as one of the at least one similar set if the distance value is smaller or equal to a predefined threshold value, wherein:

the at least one similar set represents at least one similar process to a selected process within a collection of processes, the predefined number of tokens in the prefix is computed, by at least one processor, based on the predefined distance function and the threshold value, the data structure and the collection of potentially similar sets are stored in a volatile memory of the storage device, in particular the main memory, the spatial index is only constructed for groups comprising at least a predefined number of linked sets, wherein for each group comprising less than the predefined number of linked sets the linked sets are sorted according to a random dimension of their representations, and for the selected query set an upper bound and a lower bound is computed by at least one computer processor, wherein each set comprising more tokens than the upper bound of the selected query set or less tokens than the lower bound of the selected query set is skipped.

2. The method of claim 1, wherein the predefined subspace is a query rectangle, wherein the size of the query rectangle relates to the predefined threshold value.

3. The method of claim 1, wherein the method is repeated, wherein in each repetition a different set of the collection of sets is the selected query set, until all sets of the collection of sets are processed.

4. The method of claim 1, a predefined number of pivot elements is chosen from the collection of sets, wherein the predefined number of pivot elements span the vector space.

5. The method of claim 4, wherein for each group of the data structure the predefined number of pivot elements is chosen from the linked sets of the corresponding group.

6. The method of claim 1, wherein in the probing step the groups are processed according to increasing number of tokens of their respective linked sets, and wherein each set comprising more tokens than the number of tokens of the selected query set is skipped.

7. The method of claim 1, wherein in the probing step, each set having a token in its prefix matching a token in the prefix of the selected query set is skipped if the matching token is located at a position in the set from which less tokens remain than required for a similarity between the set and the selected query set according to the predefined threshold value.

8. The method of claim 1, wherein each group of the data structure comprises at least one linked set.

9. The method of claim 1, wherein the predefined distance function is any of the group comprising:

a bound distance function, in particular the Jaccard distance function, wherein the distance value is scaled to an unbounded distance value an unbound distance function, in particular the Hamming distance function, and a non-metric distance function, in particular the Dice distance function or the Cosine distance function, wherein the predefined threshold value is scaled by a parameter, wherein the parameter is calculated based on the number of tokens in each set.

10. The method of claim 1, wherein the collection of sets comprises a large fraction of sets comprising a similar number of tokens.

11. The method of claim 1, wherein the number of unique elements in the data structure is small compared to the cardinality of the collection of sets.

\* \* \* \* \*